United States Patent [19]
Root et al.

[11] Patent Number: 4,908,975
[45] Date of Patent: Mar. 20, 1990

[54] BUCKTAIL JIG AND METHOD OF MAKING

[76] Inventors: Teddy A. Root, 7153 S. Santa Fe No. E, Oklahoma City, Okla. 73139; Wilbur H. McVay, 3905 Redbud La., Edmond, Okla. 73034

[21] Appl. No.: 316,934

[22] Filed: Feb. 27, 1989

[51] Int. Cl.⁴ ............................................. A01K 85/00
[52] U.S. Cl. .................................. 43/42.25; 43/42.28; 43/42.39; 43/42.53
[58] Field of Search ................ 43/42.25, 42.27, 42.28, 43/42.3, 42.37, 42.39, 42.53

[56] References Cited

U.S. PATENT DOCUMENTS

| | | | |
|---|---|---|---|
| 1,537,290 | 5/1925 | Bunker | 43/42.28 |
| 1,557,083 | 10/1925 | Peckinpaugh | 43/42.53 |
| 1,913,282 | 6/1933 | Major | 43/42.28 |
| 2,007,045 | 7/1935 | Francis | 43/42.39 |
| 2,036,954 | 4/1936 | Murray | 43/42.39 |
| 2,185,668 | 1/1940 | Hurdle | 43/42.28 |
| 3,017,307 | 1/1962 | Haltiburton | 43/42.25 |
| 3,590,514 | 7/1971 | Begley | 43/42.39 |
| 4,074,454 | 2/1978 | Cordell, Jr. | 43/42.28 |
| 4,712,325 | 12/1987 | Smith | 43/42.25 |

Primary Examiner—Kurt Rowan
Attorney, Agent, or Firm—Laney, Dougherty, Hessin & Beavers

[57] ABSTRACT

The invention consists of a novel form of bucktail jig which uses a hook having lead-weighted head that is formed with a longer, longitudinally extending bucktail hair mass, coupled with a shorter, generally omnidirectionally extending mass of rubber strands. The bucktail jig is made utilizing a novel form of scored rubber strip in combination with bucktail hair as tied about the rearward portion of the jig head, and subsequently the scored rubber strip is tensioned and cut to separate into a plurality of rubber strands of differing weight and texture as compared to the bucktail hair mass. The total effect is a unique and repeatable action and appearance.

5 Claims, 1 Drawing Sheet

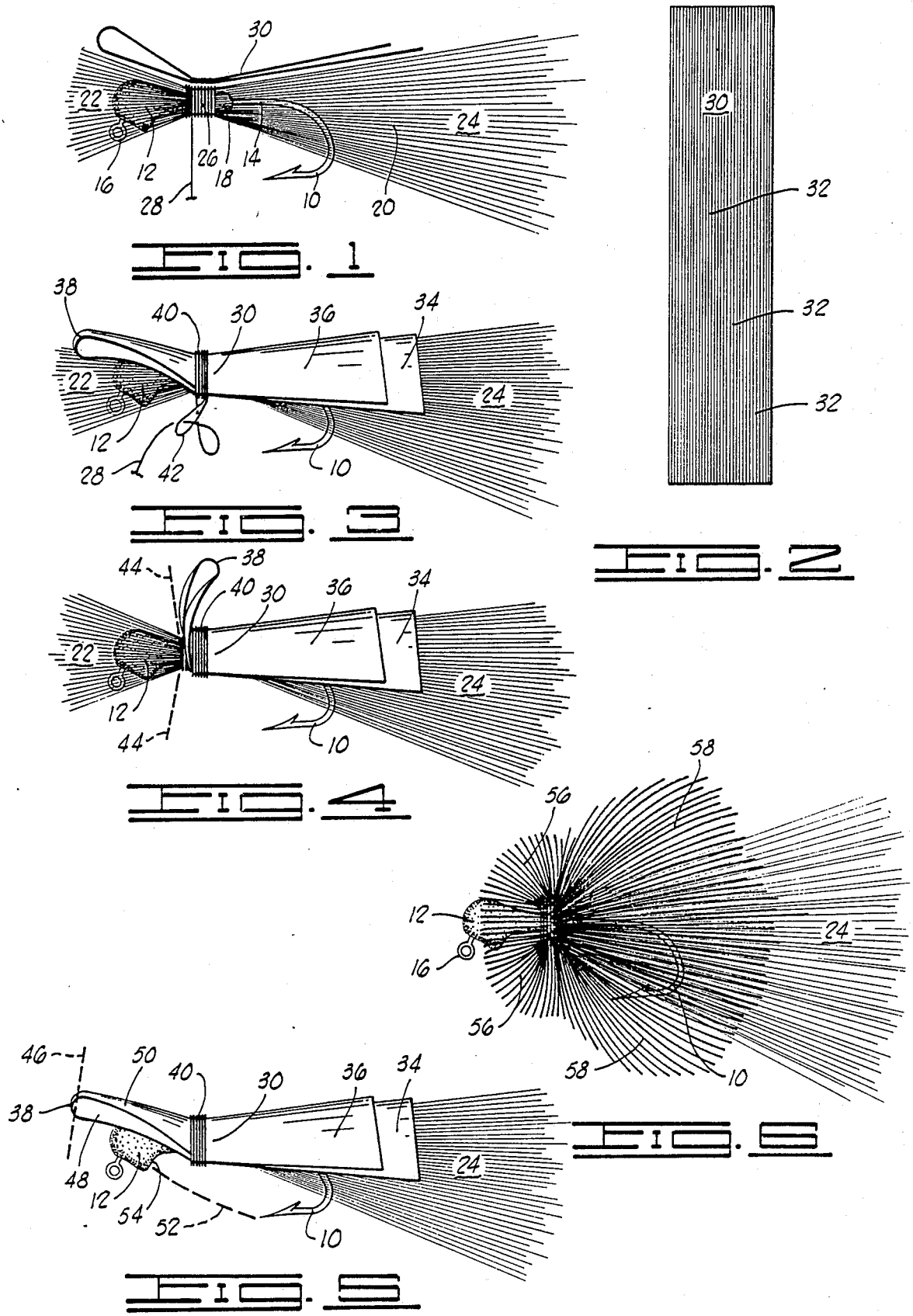

BUCKTAIL JIG AND METHOD OF MAKING

BACKGROUND OF THE INVENTION

1. Field of the Invention

The invention relates generally to fishing lures of the bucktail jig type and, more particularly, but not by way of limitation, it relates to an improved type of jig and method of manufacturing a bucktail jig whereby it achieves more desirable appearance and water action.

2. Description of the Prior Art

The prior art includes a great number of types of jig, bucktail baits and bucktail jig combinations of various size, shape, color, etc. Bucktail fishing baits have been a popular and effective type of artificial lure for a long number of years. The present invention deals both in the type of lure produced and the selection of component materials, as well as the method of tying the components together on a jig-type hook.

SUMMARY OF THE INVENTION

The present invention relates to an improvement in method of manufacturing a bucktail jig utilizing selected portions of bucktail hair and a strip of scored rubber tied and treated in a series of steps which results in a bucktail jig having a forward configuration of a mass of thin rubber strands and a trailing configuration of bucktail. The combination and weight of contributing components enables a very lively jig action when trailed through the water.

Therefore, it is an object of the present invention to provide a bucktail jig having improved water action.

It is also an object of the present invention to provide a bucktail jig that is manufactured inexpensively and yet functions very well to attract fish, particularly bass.

Finally, it is an object of the present invention to provide a novel bucktail jig that is made up of a different combination of component materials to provide novel bait action when jig fishing.

Other objects and advantages of the invention will be evident from the following detailed description when read in conjunction with the accompanying drawings which illustrate the invention.

BRIEF DESCRIPTION OF THE DRAWINGS

FIG. 1 is a view in side elevation showing a jig head hook, bucktail and folded scored rubber in a beginning phase of the manufacturing procedure;

FIG. 2 is a plan view of a strip of scored rubber as utilized in the procedure;

FIG. 3 is a view in side elevation showing a first intermediate phase of the procedure;

FIG. 4 is a view in side elevation of a second intermediate phase of the procedure;

FIG. 5 is a view in side elevation of the final phase of the procedure; and

FIG. 6 is a view in side elevation of the finally assembled bucktail jig fishing lure.

DETAILED DESCRIPTION OF THE INVENTION

Referring to FIG. 1, the first phase of manufacture requires the positioning of a selected size of hook 10 having a lead jig head 12 formed on the shank 14 within a suitable vice or other work station (not shown). Such jig hooks are made from suitable molds having selected configuration for jig head 12, and the hookeye 16 may be molded into jig head 12 or it may be merely a bent extension of shank 14. The head 12 is formed or molded to extend a narrow neck along hookshank 14 to terminate in an enlarged portion 18 thus providing a non-slip saddle for tying.

With the jig hook 10 securely positioned, a swatch of bucktail hair 20 is positioned alongside jig head 12 with a smaller portion 22 adjacent the jig head while extending a length of several multiples rearward as portion 24. The bucktail hair is available from many different sources and is merely a plastic filament, either solid or hollow, of selected color and texture suitable for the bucktail mass. Such material is available from such as Wapsi Fly, Inc. of Mountain Home, Arkansas. The bucktail hair 20 is then tied onto the shank 14 saddle portion of jig head 12 by a multiple of wraps 26 of a selected high strength thread 28.

The next phase of construction as shown in FIG. 3 utilizes a scored rubber strip 30 such as that shown in FIG. 2. Such rubber strip 30 is scored in whatever desired widths to enable subsequent separation when cut under tension. The rubber strip 30 as utilized for the jig tying operation is on the order of 0.025 inches thick and the score lines 32 are spaced about the same 0.025 inches in width so that strip 30 will be separated when cut under tension into a plurality of essentially square rubber strands. Such rubber material is sold under the name of "LIVING RUBBER" and is commercially available from Frank Haucks Company of Byron, California.

Referring again to FIG. 3, the scored rubber strip 30 is then folded in half lengthwise, with the lower layer slightly overlapping, to form a lower layer 34 and an upper layer 36, and a fold 38 is positioned along the jig hook 10 slightly forward of jig head 12. A second series of wraps 40 is then taken with securing thread 28 as secured with a wrapped loop knot 42 and pulled tight for subsequent trimming of the bitter ends.

As shown in FIG. 4, the next construction phase requires the manual retention of the fold end 38 of scored rubber strip 30 rearward while a razor cut indicated by dash lines 44 is made about the jig head 12 immediately forward of the wrap 26 thereby to remove the bulk of bucktail hair 22. As shown in FIG. 5, a cut as indicated by dash line 46 is then made across the width of scored rubber strip 30 at the folded end 38, this resulting in two forward flaps of scored rubber consisting of a lower flap 48 and an upper flap 50. At this point it may also be included to insert a selected form of weed guard 52 in a recess 54 preformed in the underside of jig head 12. Then, with the jig hook 10 still secured in the support vice, each one of the scored rubber flaps 48, 50 and 34, 36 is separated by a tension/cutting operation. That is, first the flap 48 is stressed lengthwise under tension by means of long nose pliers or the like and a scissor cut is made thereacross adjacent the plier. This cutting under tension has the effect of separating the strip at each of the score lines 32 thereby resulting in a plurality of rubber strands of about 0.025 inch square dimension. Each of flaps 50, 34 and flap 36 is similarly tension stressed and scissor cut to effect separation at score lines 32 thereby resulting in a tassle of strands.

FIG. 6 illustrates the final product wherein the tassle of strands, forward rubber strands 56 resulting from separation of forward flaps 48 and 50, and rearward rubber strands 58 resulting from separation of rearward flaps 34 and 36, are bushily retained about the head portion of the jig while the longer and lighter bucktail strands will trail behind in more central or longitudinally axial position. As a practical matter, it is sometimes easier to separate the flaps 48, 50, 34 and 36 by cutting when each flap is first divided longitudinally into three sections and the sections are done individually; however, this is not a necessity as proper tensioning and cutting tools will assure speedy separation of the individual square rubber strands.

The apparent unique water action of the lure can be primarily attributed to the forward rubber strands 56. Accordingly, it is contemplated that a very effective lure may also result by using only the rubber strands and eliminating use of any bucktail hair. The appearance of the bait is somewhat altered but the same action is achieved when the lure is let through water.

The rubber strip 30 and bucktail hair 20 may be selected from any number of colors of the requisite material, and it is contemplated that the bucktail hair 20 also be used in combinations of different color and/or texture of hair material. A unique action is achieved by movement in water of the finished jig due to the difference in stiffness and weight as between the rubber strand material and the bucktail hairs. The combination of differently reacting materials causes a unique action that is apparently highly effective in attracting fish. The action can be further fine tuned by variations in both length of bucktail hair and length and concentration of rubber strands forward of the center of gravity of the bucktail jig.

Changes may be made in combination and arrangements of elements as heretofore set forth in the specification and shown in the drawings; it being understood that changes may be made in the embodiments disclosed without departing from the spirit and scope of the invention as defined in the following claims.

What is claimed is:

1. A method of manufacturing a bucktail jig type of fishing lure, comprising:
   preparing a jig hook having hook end, shank and jig head extending from a hook eye to a saddle portion about midway rearward along said shank;
   selecting a swatch of selected bucktail hair as positioned in general alignment with the jig hook, and tying with thread wrap proximate the forward end of the swatch to secure the swatch to the jig head saddle portion;
   selecting a length of scored rubber strip and doubling at least once lengthwise in approximately half by folding across the narrow dimension, and placing the rubber strip with the fold end adjacent the hook islet with the remaining upper and lower ends extending rearward of the jig head, and tying the scored rubber with multiple wraps around the jig head saddle portion and securing the thread in a loop knot and trimming thread ends;
   restraining the loop end of the scored rubber strip rearward and trimming the bucktail hair immediately forward of the thread wrap;
   cutting across the scored rubber strip proximate the fold; and
   distending lengthwise each of the scored rubber strips and cutting transversely proximate their outer extremity thereby to separate each scored rubber strip into a plurality of rubber strands.

2. A method of manufacturing a bucktail jig as set forth in claim 1 wherein:
   said scored rubber strip is folded lengthwise with the bottom rear end extending slightly beyond the top rear end, and said strip is tied about one third of the way rearward of its folded long dimension.

3. A method of manufacturing a bucktail jig as set forth in claim 1 wherein:
   said swatch of bucktail hair includes hollow filamentary material.

4. A method of manufacturing a bucktail jig as set forth in claim 1 wherein:
   said cutting at the folded end of said scored rubber strip occurs proximate the fold on the lower strip so that the strands developed from the upper strip will be longer than the strands of the lower strip.

5. A method of manufacturing a bucktail jig as set forth in claim 2 wherein:
   said cutting at the folded end of said scored rubber strip occurs proximate the fold on the lower strip so that the strands developed from the upper strip will be longer than the strands of the lower strip.

* * * * *